United States Patent
Ke et al.

(10) Patent No.: US 8,837,571 B1
(45) Date of Patent: Sep. 16, 2014

(54) APPARATUS AND METHODS FOR ON-DIE INSTRUMENTATION

(71) Applicant: Altera Corporation, San Jose, CA (US)

(72) Inventors: Yanjing Ke, Union City, CA (US); Thungoc M Tran, San Jose, CA (US); Weiqi Ding, Fremont, CA (US); Jie Shen, Fremont, CA (US); Xiong Liu, Cupertino, CA (US); Sangeeta Raman, San Jose, CA (US); Peng Li, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/958,395

(22) Filed: Aug. 2, 2013

(51) Int. Cl.
*H03K 5/159* (2006.01)
*H04L 27/01* (2006.01)

(52) U.S. Cl.
CPC .................................... *H04L 27/01* (2013.01)
USPC ........... 375/233; 375/316; 375/229; 375/232; 375/230

(58) Field of Classification Search
USPC .......................... 375/316, 233, 229, 232, 230
See application file for complete search history.

(56) References Cited

U.S. PATENT DOCUMENTS

| 7,701,833 | B2 | 4/2010 | Kim et al. | |
|---|---|---|---|---|
| 7,764,732 | B2 | 7/2010 | Rollins et al. | |
| 8,098,724 | B2 | 1/2012 | Shumarayev et al. | |
| 8,619,848 | B2 * | 12/2013 | Jiang | 375/233 |
| 2008/0320324 | A1 | 12/2008 | Ke et al. | |
| 2012/0057627 | A1 | 3/2012 | Chan et al. | |
| 2014/0169438 | A1 * | 6/2014 | Lin et al. | 375/232 |

* cited by examiner

*Primary Examiner* — Siu Lee
(74) *Attorney, Agent, or Firm* — Okamoto & Benedicto LLP

(57) ABSTRACT

One embodiment relates to a receiver with both decision feedback equalization and on-die instrumentation. A clock data recovery loop obtains a recovered clock signal from an input signal, and a first sampler, which is triggered by the recovered clock signal, generates a recovered data signal from the input signal. A phase interpolator receives the recovered clock signal and generates a phase-interpolated clock signal. A second sampler is triggered by the recovered clock signal in a decision feedback equalization mode and by the phase-interpolated clock signal in an on-die instrumentation mode. Other embodiments and features are also disclosed.

20 Claims, 10 Drawing Sheets

APPARATUS AND METHODS FOR ON-DIE INSTRUMENTATION

BACKGROUND

1. Technical Field

The present invention relates generally to data communications. More particularly, the present invention relates to circuitry for high-speed data links.

2. Description of the Background Art

High-speed data links are used to communicate data between devices in a system. Serial interface protocols have been developed at increasingly fast data rates for such high-speed data links.

On-die instrumentation (ODI) has become increasingly important for high-speed data links, particularly when off-chip probing may not reveal the exact receiver waveforms. ODI provides visibility to the receive side data after equalization. Using ODI, an eye-opening view of chip performance may be obtained so as to assist in configuring the receiver for optimum data sampling.

SUMMARY

One embodiment relates to a receiver with both decision feedback equalization and on-die instrumentation. A clock data recovery loop obtains a recovered clock signal from an input signal, and a first sampler, which is triggered by the recovered clock signal, generates a recovered data signal from the input signal. A phase interpolator receives the recovered clock signal and generates a phase-interpolated clock signal. A second sampler is triggered by the recovered clock signal in a decision feedback equalization mode and by the phase-interpolated clock signal in an on-die instrumentation mode.

Another embodiment relates to a method of providing both ODI and decision feedback equalization (DFE) in an integrated circuit. A recovered clock signal from an input signal, and a recovered data signal is generated from the input signal using a first sampler triggered by the recovered clock signal. A phase-interpolated clock signal is generated by applying phase interpolation to the recovered clock signal. A second sampler is triggered using the recovered clock signal in a first operating mode which performs decision feedback equalization adaptation and is triggered using the phase-interpolated clock signal in a second operating mode so as to generate eye-diagram data for, the on-die instrumentation.

Other embodiments and features are also disclosed.

DETAILED DESCRIPTION

Figure 1:
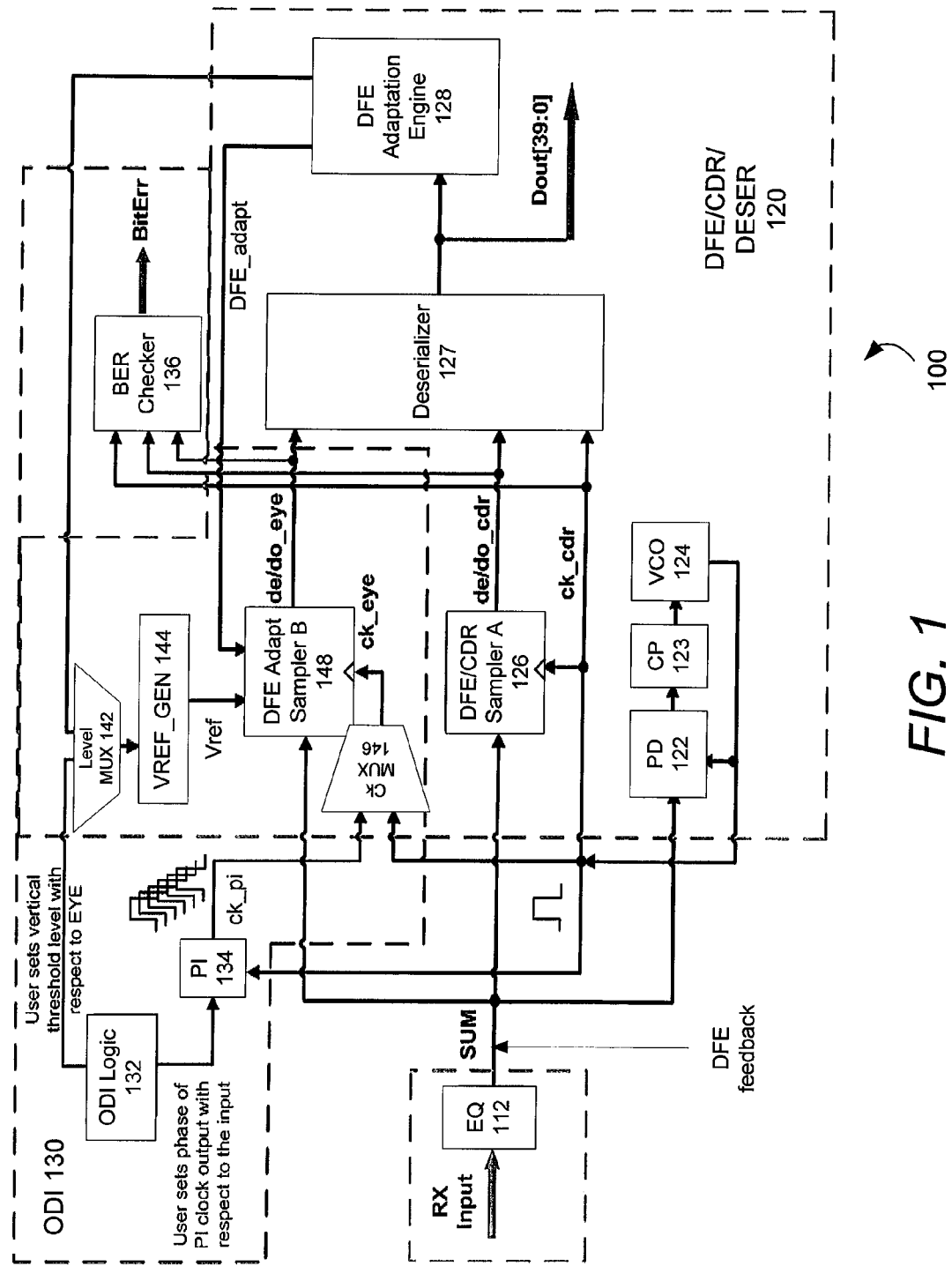
FIG. 1 depicts a receiver for a high-speed serial data link in accordance with an embodiment of the invention.

Conventional ODI circuits for high-speed serial data links are generally independent circuit modules that have their own samplers. The ODI samplers typically probe the data path at a sum node of the equalizer output and so disturbs the data path. Moreover, in a speculative DFE architecture, the final data decision depends on previous data. The DFE feedback loop on the data path generally makes implementing ODI functionalities a highly complicated task.

The present disclosure overcomes these issues by presenting an innovative architecture for ODI circuitry that shares circuitry with (i.e. is partially integrated with) the speculative DFE adaptation circuitry. This architecture may be referred to as an ODI/DFE multiplexing architecture.

The ODI/DFE multiplexing architecture embodiments disclosed herein advantageously shares select components. In an exemplary embodiment, the ODI circuitry shares sampler and reference voltage generator circuits with the speculative DFE adaptation circuitry. By using the DFE adaptation path for ODI data sampling, the ODI is able to monitor the real data because the DFE adaptation path operates as a replica of the CDR path. However, the data monitoring is unobtrusive since the ODI shares samplers with the DFE adaptation and so does not need to separately probe the CDR data path at the sum node. Such embodiments of the ODI/DFE multiplexing architecture that share select components as described herein can be advantageously used to implement the ODI functionality using reduced circuit area, and improved signal integrity as well as measurement accuracy since the ODI circuit samples substantially the same signals as the DFE in a non-destructive manner.

In addition, embodiments of the ODI/DFE multiplexing architecture may use a shared structure to resynchronize between data signals obtained using phase-interpolated clocks and the CDR clock. Such embodiments may advantageously simplify design of the bit error rate (BER) checker which is the next functional stage. This is because data sent to the BER checker is already even/odd aligned in one clock domain.

The sharing of sampler and reference voltage generator circuits may be done in a time multiplexed (or time sharing) manner. The time multiplexing may be accomplished using two operating modes: a DFE mode; and an ODI mode.

In the DFE mode, both data path and DFE adaptation samplers use the clock data recovery (CDR) clock at phases 0 degrees and 180 degrees to sample even and odd data (deven/dodd). The speculative DFE adaptation uses the even and odd data because it needs prior bit CDR data to do output selection.

In the ODI mode, the DFE adaptation samplers use the ODI phase interpolator (PI) output clock at phases 0 and 180 degrees to sample even and odd data. However, the output selection still needs to use prior bit data from the CDR data path (deven/dodd). As a result, it becomes desirable to perform data resynchronization between the PI and CDR clock domains. The resynchronization between the PI data and the CDR data is performed in the architecture disclosed herein. This resynchronization simplifies design of the bit error rate (BER) checker of the ODI because the data sent to the BER checker is already even/odd aligned in one clock domain.

FIG. 1 depicts a receiver 100 for a high-speed serial data link in accordance with an embodiment of the invention. The circuitry of the receiver 100 is shown in circuit sections indicated by the dashed lines. The circuit sections shown include a RX (receiver) section 110, a DFE/CDR/DESER (decision feedback equalization/clock data recovery/de-serialization) section 120, and an ODI (on-die instrumentation) section 130.

The RX section 110 may receive a serial data signal from the data link into a receive buffer, and the receive buffer may provide the serial data signal (RX Input) to an equalization (EQ) circuit 112. The EQ circuit 112 may include a continuous-time linear equalization circuit, for example, and may also include variable gain amplifier circuitry.

The DFE/CDR/DESER section 120 may include, among other circuits: a CDR loop (PD 122, CP 123 and VCO 124); a DFE/CDR sampler (DFE/CDR Sampler A or simply "Sampler A") 126, a Deserializer 127, a speculative DFE adaptation engine 128, a reference voltage generator (VREF_GEN) 144, and a speculative DFE adaptation sampler (DFE Adapt Sampler B or simply "Sampler B") 148.

The ODI section 130 may include, among other circuits: ODI logic 132, phase interpolator 134, and bit error rate (BER) checker 136. In addition, the ODI section 130 also includes VREF_GEN 144 and DFE Adapt Sampler B 148 of the DFE/CDR/DESER section 120. In other words, VREF_GEN 144 and DFE Adapt Sampler B 148 are shared by both the DFE/CDR/DESER section 120 and the ODI section 130.

As shown, the output of the EQ circuit 112 of the RX section 110 may be provided to the sum (SUM) node. Note that the SUM node effectively adds together the data signal from the EQ circuit 112 with the error signal from the feedback filter of the DFE circuit (DFE feedback).

As further shown, the SUM node may be connected to the inputs of the clock data recovery (CDR) loop (i.e. to PD 122) and two sampler circuits (Sampler A and Sampler B). As mentioned above, Sampler A is used for both DFE and CDR, and Sampler B is used for DFE adaptation. In accordance with an embodiment of the invention, Sampler B is also used by the ODI circuitry.

As depicted, the CDR loop may include, among other circuits, a phase detector (PD) 122, a charge pump (CP) 123 and a voltage-controlled oscillator (VCO) 124, where the PD 122, CP 123 and VCO 124 are arranged in a loop. The input to the PD 122 may be connected to the SUM node, and the output of the VCO 124 provides a recovered clock signal (ck_cdr).

The ck_cdr signal may be provided to: (i) the clock input of the Deserializer 127; (ii) the clock input of DFE/CDR Sampler A 126; (iii) a first input of a clock signal multiplexer (Ck MUX 146) that provides a clock signal (ck_eye) to DFE Adaptation Sampler B 148; and (iv) the phase interpolator (PI) 134 that provides its output clock signal (ck_pi) to a second input of Ck MUX 146; and v) to BER Checker 136. BER Checker 136 may output a bit error signal (BitErr) to further ODI circuitry.

Sampler A 126 receives the equalized Rx Input signal from the SUM node and samples that signal using the ck_cdr clock signal. Sampler A 126 outputs even and odd data signals (de/do_cdr) to both the Deserializer 127 and the BER Checker 136. The Deserializer 127 may output a parallel data signal Dout[39:0]. The parallel data signal is shown as being 40-bits wide, but other widths may be used, depending on the specific implementation.

Sampler B 148 receives the equalized Rx Input signal from the SUM node and samples that data signal using the ck_eye clock signal. Sampler B 148 outputs even and odd data signals (De/Do_eye) to both the Deserializer 127 and the BER Checker 136. Sampler B 148 also receives an output signal (DFE_adapt) from the DFE Adaptation Engine 128. As described above, the ck_eye clock signal may be controllably selected by Ck MUX 146 to be either ck_cdr or ck_pi. The phase of the ck_pi clock signal that is output by the PI 134 may be set by a user via the ODI Logic 132. The phase of the ck_pi clock signal may be set relative to the phase of the ck_cdr clock signal.

The reference voltage (Vref) that is used as a vertical threshold level is generated by VREF_GEN 144. VREF_GEN 144 may be controlled by the output of a control multiplexer (Level MUX 142). A first input of Level MUX 142 receives a first threshold control signal from the ODI Logic 132 and a second input of Level MUX 142 receives a second threshold control signal from the DFE Adaptation Engine 128. The first threshold control signal from the ODI Logic 132 may be set by a user of the integrated circuit so as to set the vertical threshold level with respect to the eye diagram.

In accordance with an embodiment of the invention, time sharing (time division multiplexing) is used by the circuitry in FIG. 1 to provide both DFE adaptation and ODI adaptation functionalities. During a first set of times, DFE adaptation functionality is provided using a first set of blocks including the CDR loop (PD, CP and VCO), Sampler A, VREF_GEN, Sampler B, and DFE Adaptation Engine. During a second set of times, ODI adaptation functionality is provided using a second set of blocks including ODI Logic, PI, VREF_GEN, Sampler B and BER Checker. Note that VREF_GEN and Sampler B are shared blocks that are utilized for both DFE adaptation and ODI adaptation functionalities.

Figure 2:
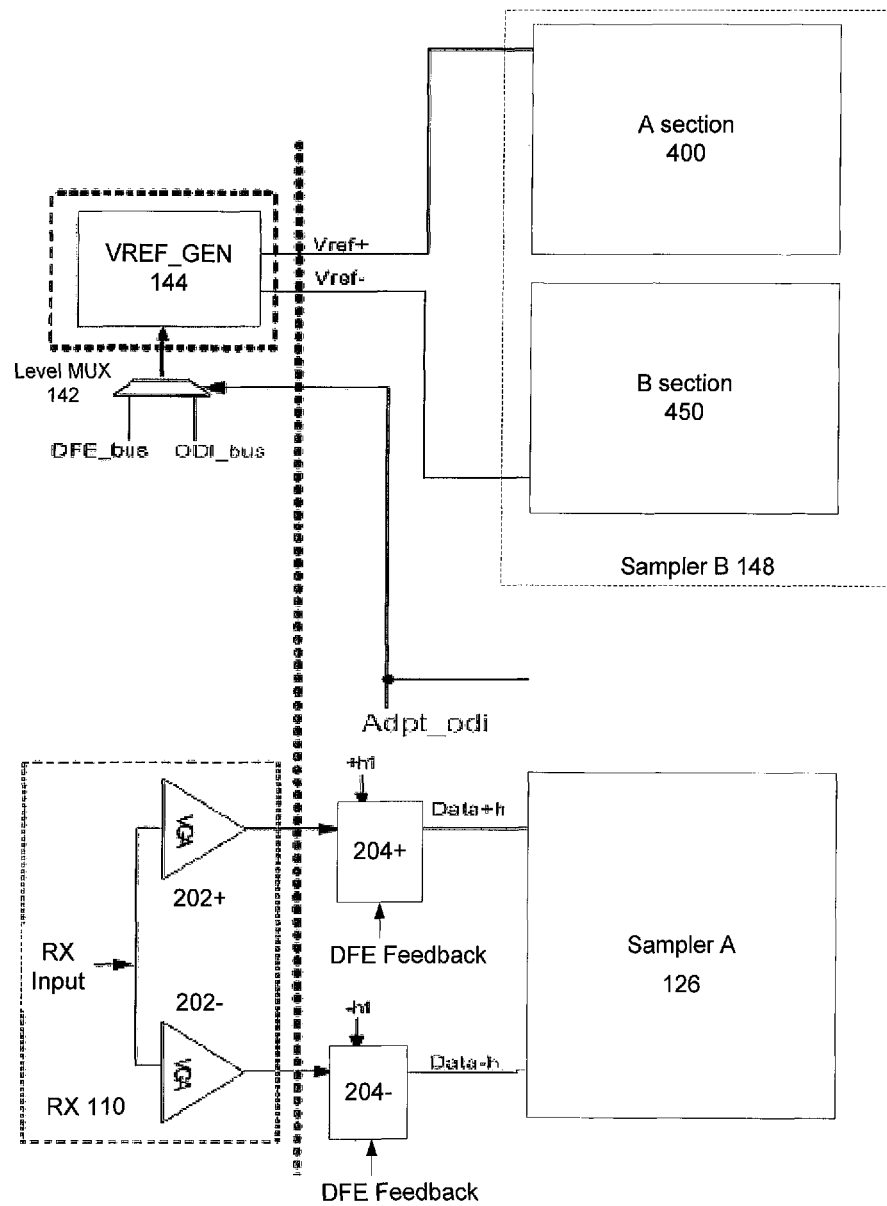
FIGS. 2, 3, 4A and 4B provide a detailed circuit implementation for select blocks of the receiver of FIG. 1 in accordance with an embodiment of the invention.
Figure 3:
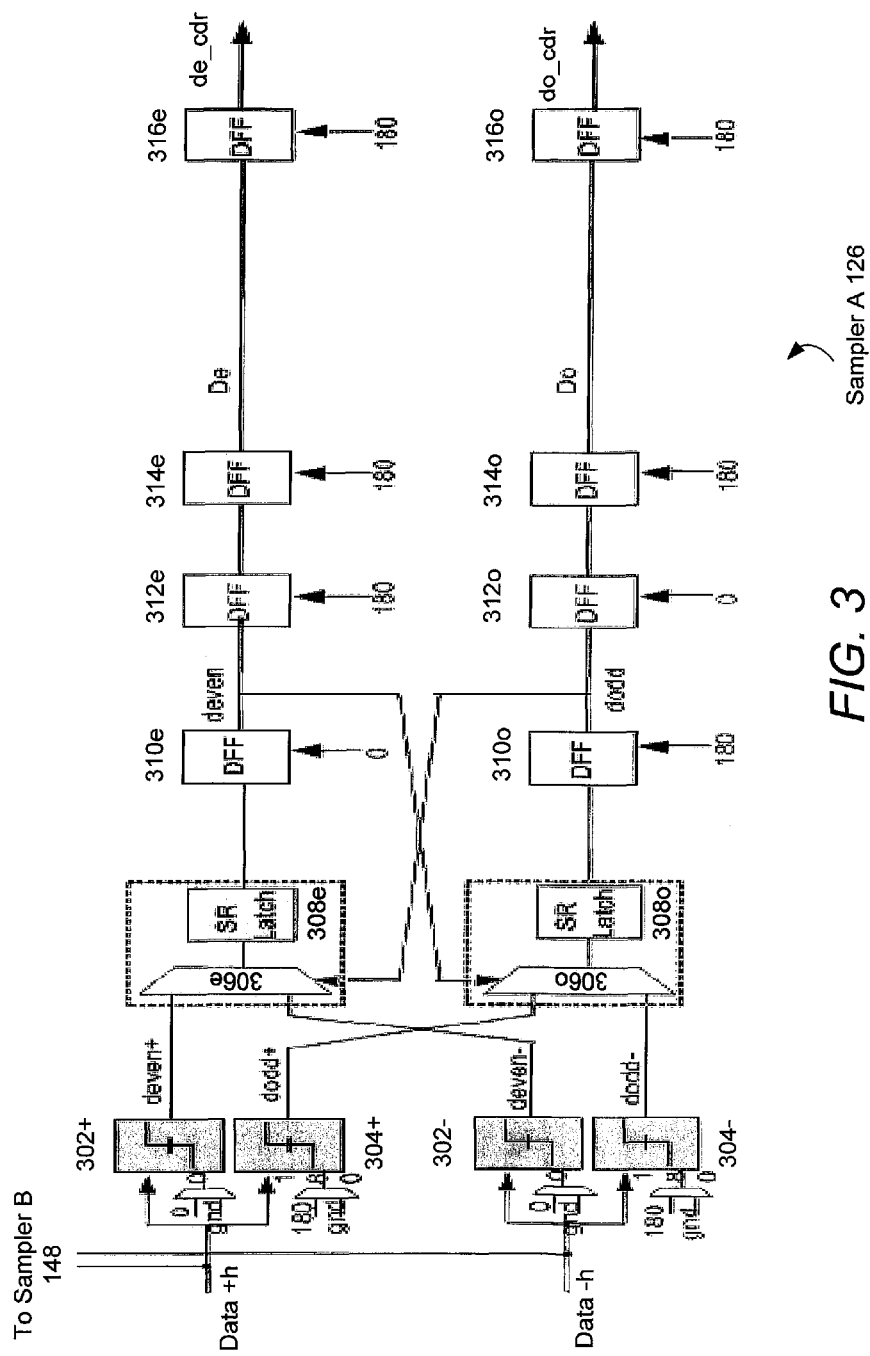
Figure 4A:
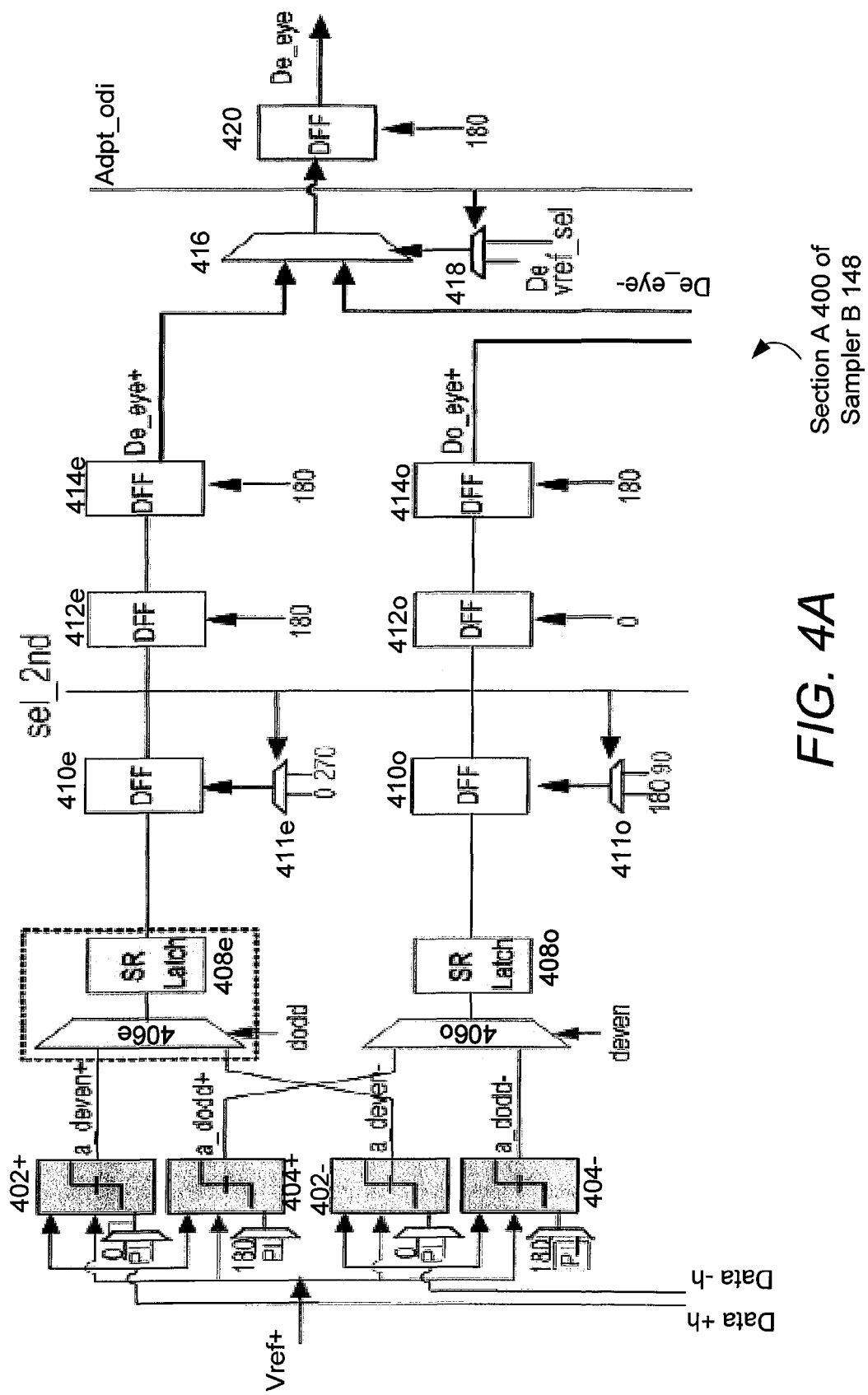
Figure 4B:
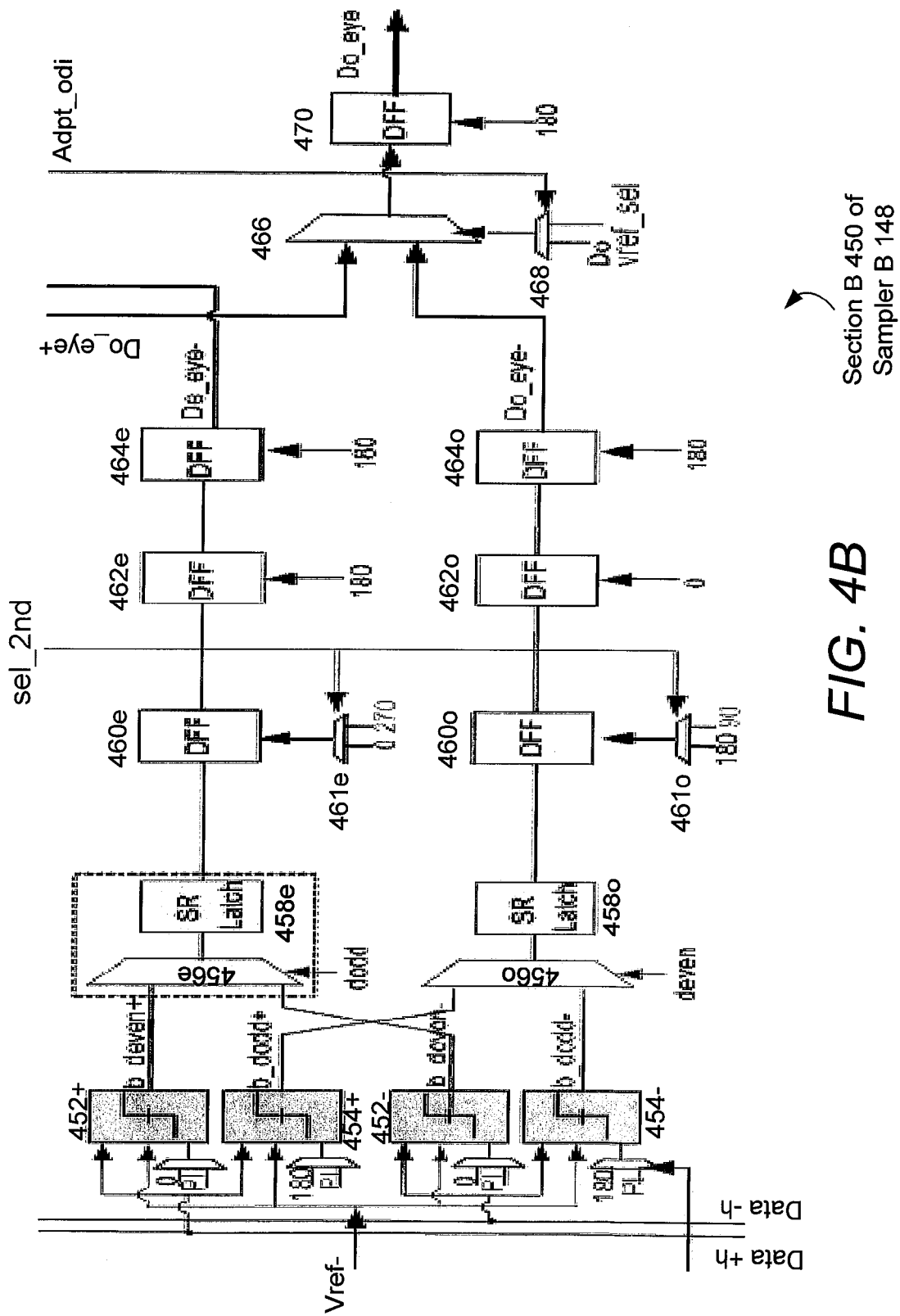

FIGS. 2, 3, 4A and 4B provide a detailed circuit implementation for select blocks of the receiver 100 of FIG. 1 in accordance with an embodiment of the invention. FIG. 2 shows the RX 110 and VREF_GEN 144 blocks and their interconnections with Sampler A 126 and Sampler B 148 in accordance with an embodiment of the invention. FIG. 3 shows detailed circuitry for Sampler A 126. FIG. 4A shows Section A 400 of Sampler B 148, and FIG. 4B shows Section B 450 of Sampler B 148.

As shown at the bottom part of FIG. 2, two variable-gain amplifier (VGA) circuits in RX 110 may receive the RX Input signal. A first VGA 202+ may provide a data signal to a first decision circuit 204+, and a second VGA 202− may provide a data signal to a second decision circuit 204−. The first decision circuit 204+ receives the data signal from VGA 202+, a positive DFE tap value (+h1), and a DFE feedback signal. The first decision circuit 204+ outputs a positive-polarity data signal (Data +h) to Sampler A 126. The second decision circuit 204− receives the data signal from VGA 202−, a negative DFE tap value (−h1), and a DFE feedback signal. The first decision circuit 204+ outputs a negative-polarity data signal (Data −h) to Sampler A 126.

As shown at the top part of FIG. 2, VREF_GEN 144 receives a control signal which sets the level or levels of the reference voltage. The control signal is provided by the Level MUX 142 which selects either the DFE_bus signal from the DFE Adaptation Engine 128 or the ODI_bus signal from the ODI Logic 132. As further depicted, the selection by the Level MUX 142 may be controlled by the Adpt_odi control signal. When the DFE mode is active, then Level MUX 142 selects the DFE_bus signal. When ODI adaptation mode is active, then Level MUX 142 selects the ODI_bus signal.

VREF_GEN 144 outputs a positive-polarity reference voltage (Vref+) and a negative-polarity reference voltage (Vref−). Vref+ is provided to Section A 400 of Sampler B 148, and Vref− is provided to Section B 450 of Sampler B 148.

FIG. 3 depicts an exemplary implementation of Sampler A 126 in accordance with an embodiment of the invention. As shown, the Data +h signal is received by even sampler circuit 302+ and odd sampler circuit 304+, and the Data −h signal is received by even sampler circuit 302− and odd sampler circuit 304−.

The even sampler circuit 302+ samples the Data +h signal using a phase 0 clock signal, where the phase 0 clock signal is the ck_cdr clock signal shifted by 0 degrees. The even sampler circuit 302+ outputs a deven+ data signal. The odd sampler circuit 304+ samples the Data +h signal using a phase 180 clock signal, where the phase 180 clock signal is the ck_cdr clock signal shifted by 180 degrees. The odd sampler circuit 304+ outputs a dodd+ data signal.

Similarly, the even sampler circuit 302− samples the Data −h signal using the phase 0 clock signal and outputs a deven− data signal. The odd sampler circuit 304− samples the Data −h signal using a phase 180 clock signal and outputs a dodd− data signal.

The even selector 306e receives the deven+ and deven− data signals and the dodd signal as a control signal. Based on the dodd control signal, the even selector 306e selects one of the deven+ and deven− data signals for output to the even set-reset (SR) Latch 308e.

Similarly, the odd selector 306o receives the dodd+ and dodd− data signals and the deven signal as a control signal. Based on the deven control signal, the odd selector 306o selects one of the dodd+ and dodd− data signals for output to the odd SR Latch 308o.

The output of the even SR latch 308e may be provided to a series of four flip-flops: DFF 310e; DFF 312e; DFF 314e; and DFF 316e. DFF 310e is triggered by the phase 0 clock signal (i.e by ck_cdr). DFF 312e, DFF 314e and DFF 316e are triggered by the phase 180 clock signal (i.e. by ck_cdr shifted by 180 degrees). DFF 310e outputs the deven signal that is provided to the odd selector 306o. The output of DFF 314e is the even data signal De that may be used as a control signal by a selector 416 in Section A 400 of Sampler B 148. The output of DFF 316e is the even data signal de_cdr that is provided to the deserializer 127.

Similarly, the output of the odd SR latch 308o may be provided to a series of four flip-flops: DFF 310o; DFF 312o; DFF 314o; and DFF 316o. DFF 312o is triggered by the phase 0 clock signal (i.e by ck_cdr). DFF 310o, DFF 314o and DFF 316o are triggered by the phase 180 clock signal (i.e. by ck_cdr shifted by 180 degrees). DFF 310o outputs the dodd signal that is provided to the even selector 306e. The output of DFF 314o is the odd data signal Do that may be used as a control signal by a selector 466 in Section B 450 of Sampler B 148. The output of DFF 316o is the odd data signal do_cdr that is provided to the deserializer 127.

FIG. 4A depicts an exemplary implementation of Section A 400 of Sampler B 148 in accordance with an embodiment of the invention. Sampler B 148 is shared by the DFE adaptation circuitry and the ODI circuitry. As such, Section A of Sampler B 148 operates in one of two modes: a DFE mode; and an ODI mode. The samplers in Section A generate data signals using Vref+ from VREF_GEN 144.

As shown, the Data +h signal is received by even sampler circuit 402+ and odd sampler circuit 404+. The even sampler circuit 402+ samples the Data +h signal using a phase 0 clock signal in the DFE mode or using a phase interpolator (PI) clock signal in the ODI mode. The phase 0 clock signal is the ck_cdr clock signal shifted by 0 degrees, and the PI_0 clock signal is the ck_pi clock signal from PI 134. The ck_pi clock signal is phase shifted from the ck_cdr clock signal. The even sampler circuit 402+ outputs an a_deven+ data signal. The odd sampler circuit 404+ samples the Data +h signal using a phase 180 clock signal in the DFE mode or using the PI_180 clock signal in the ODI mode. The phase 180 clock signal is the ck_cdr clock signal phase shifted by 180 degrees, and the PI_180 clock signal is the ck_pi clock signal phase shifted by 180 degrees. The odd sampler circuit 404+ outputs an a_dodd+ data signal.

Similarly, the Data −h signal is received by even sampler circuit 402− and odd sampler circuit 404−. The even sampler circuit 402− samples the Data −h signal using a phase 0 clock signal in the DFE mode or using the PI_0 clock signal in the ODI mode. The even sampler circuit 402− outputs an a_deven− data signal. The odd sampler circuit 404− samples the Data −h signal using a phase 180 clock signal in the DFE mode or using the PI_180 clock signal in the ODI mode. The odd sampler circuit 404− outputs an a_dodd− data signal.

The even selector 406e receives the a_deven+ and a_deven− data signals and the dodd signal as a control signal. Based on the dodd control signal, the even selector 406e selects one of the a_deven+ and a_deven− data signals for output to the even SR Latch 408e.

Similarly, the odd selector 406o receives the a_dodd+ and a_dodd− data signals and the deven signal as a control signal. Based on the deven control signal, the odd selector 406o selects one of the a_dodd+ and a_dodd− data signals for output to the odd SR Latch 408o.

The output of the even SR latch 408e may be provided to a series of three flip-flops: DFF 410e; DFF 412e; and DFF 414e. DFF 410e is triggered by the output of clock selector 411e. The clock selector 411e is controlled by the sel_2$^{nd}$ control signal such that the clock selector 411e outputs phase 0 clock signal (i.e ck_cdr) in the DFE mode and either the phase 0 or the phase 270 clock signal (i.e. ck_cdr shifted by 0 or 270 degrees) in the ODI mode. DFF 412e and DFF 414e are triggered by the phase 180 clock signal (i.e. by ck_cdr shifted by 180 degrees). The output of DFF 414e is the even data signal De_eye+.

Similarly, the output of the odd SR latch 408o may be provided to a series of three flip-flops: DFF 410o; DFF 412o; and DFF 414o. DFF 410o is triggered by the output of clock selector 411o. The clock selector 411o is controlled by the sel_2$^{nd}$ control signal such that the clock selector 411o outputs the phase 180 clock signal (i.e ck_cdr shifted by 180 degrees) in the DFE mode and either the phase 180 or the phase 90 clock signal (i.e. ck_cdr shifted by 180 or 90 degrees) in the ODI mode. DFF 412o and DFF 414o are triggered by the phase 0 and phase 180 clock signals, respectively. The output of DFF 414o is the odd data signal Do_eye+.

The even data selector 416 receives the even data signal De_eye+ from DFF 414e and the even data signal De_eye− from DFF 464e. The even data selector 416 is controlled by the output of MUX 418. MUX 418 is controlled by the Adpt_odi control signal such that MUX 418 outputs the De signal in the DFE mode and the vref_sel signal in the ODI mode. The output of the even data selector 416 is provided to DFF 420. DFF 420 is triggered by the phase 180 clock signal and outputs the De_eye data signal to the deserializer 127.

FIG. 4B depicts an exemplary implementation of Section B 450 of Sampler B 148 in accordance with an embodiment of the invention. Like Section A 400, Section B 450 of Sampler B 148 operates in one of two modes: the DFE mode; and the ODI mode. While the samplers in Section A 400 generate data signals using Vref+, the samplers in Section B 450 generate data signals using Vref−.

As shown, the Data +h signal is received by even sampler circuit 452+ and odd sampler circuit 454+. The even sampler circuit 452+ samples the Data +h signal using a phase 0 clock signal in the DFE mode or using the PI_0 clock signal in the ODI mode. The even sampler circuit 452+ outputs a b_deven+ data signal. The odd sampler circuit 454+ samples the Data +h signal using a phase 180 clock signal in the DFE mode or using the PI_180 clock signal in the ODI mode. The odd sampler circuit 454+ outputs an b_dodd+ data signal.

Similarly, the Data –h signal is received by even sampler circuit 452– and odd sampler circuit 454–. The even sampler circuit 452– samples the Data –h signal using a phase 0 clock signal in the DFE mode or using the PI_0 clock signal in the ODI mode. The even sampler circuit 452– outputs an b_deven– data signal. The odd sampler circuit 454– samples the Data –h signal using a phase 180 clock signal in the DFE mode or using the PI_180 clock signal in the ODI mode. The odd sampler circuit 454– outputs an b_dodd– data signal. The even selector 405e receives the b_deven+ and b_deven– data signals and the dodd signal as a control signal. Based on the dodd control signal, the even selector 456e selects one of the b_deven+ and b_deven– data signals for output to the even SR Latch 458e.

Similarly, the odd selector 456o receives the b_dodd+ and b_dodd– data signals and the deven signal as a control signal. Based on the deven control signal, the odd selector 456o selects one of the b_dodd+ and b_dodd– data signals for output to the odd SR Latch 458o.

The output of the even SR latch 458e may be provided to a series of three flip-flops: DFF 460e; DFF 462e; and DFF 464e. DFF 460e is triggered by the output of clock selector 461e. The clock selector 461e is controlled by the sel_2$^{nd}$ control signal such that the clock selector 461e outputs the phase 0 clock signal (i.e ck_cdr) in the DFE mode and either the phase 0 or the phase 270 clock signal (i.e. ck_cdr shifted by 0 or 270 degrees) in the ODI mode. DFF 462e and DFF 464e are triggered by the phase 180 clock signal (i.e. by ck_cdr shifted by 180 degrees). The output of DFF 464e is the even data signal De_eye+.

Similarly, the output of the odd SR latch 458o may be provided to a series of three flip-flops: DFF 460o; DFF 462o; and DFF 464o. DFF 460o is triggered by the output of clock selector 461o. The clock selector 461o is controlled by the sel_2$^{nd}$ control signal such that the clock selector 461o outputs the phase 180 clock signal (i.e ck_cdr shifted by 180 degrees) in the DFE mode and either the phase 180 or the phase 90 clock signal (i.e. ck_cdr shifted by 180 or 90 degrees) in the ODI mode. DFF 462o and DFF 464o are triggered by the phase 0 and phase 180 clock signals, respectively. The output of DFF 464o is the odd data signal Do_eye+.

The odd data selector 466 receives the odd data signal Do_eye+ from DFF 414o and the odd data signal Do_eye– from DFF 464o. The odd data selector 466 is controlled by the output of MUX 468. MUX 468 is controlled by the Adpt_odi control signal such that MUX 468 outputs the Do signal in the DFE mode and the vref_sel signal in the ODI mode. The output of the odd data selector 466 is provided to DFF 470. DFF 470 is triggered by the phase 180 clock signal and outputs the Do_eye data signal to the deserializer 127.

Figure 5:
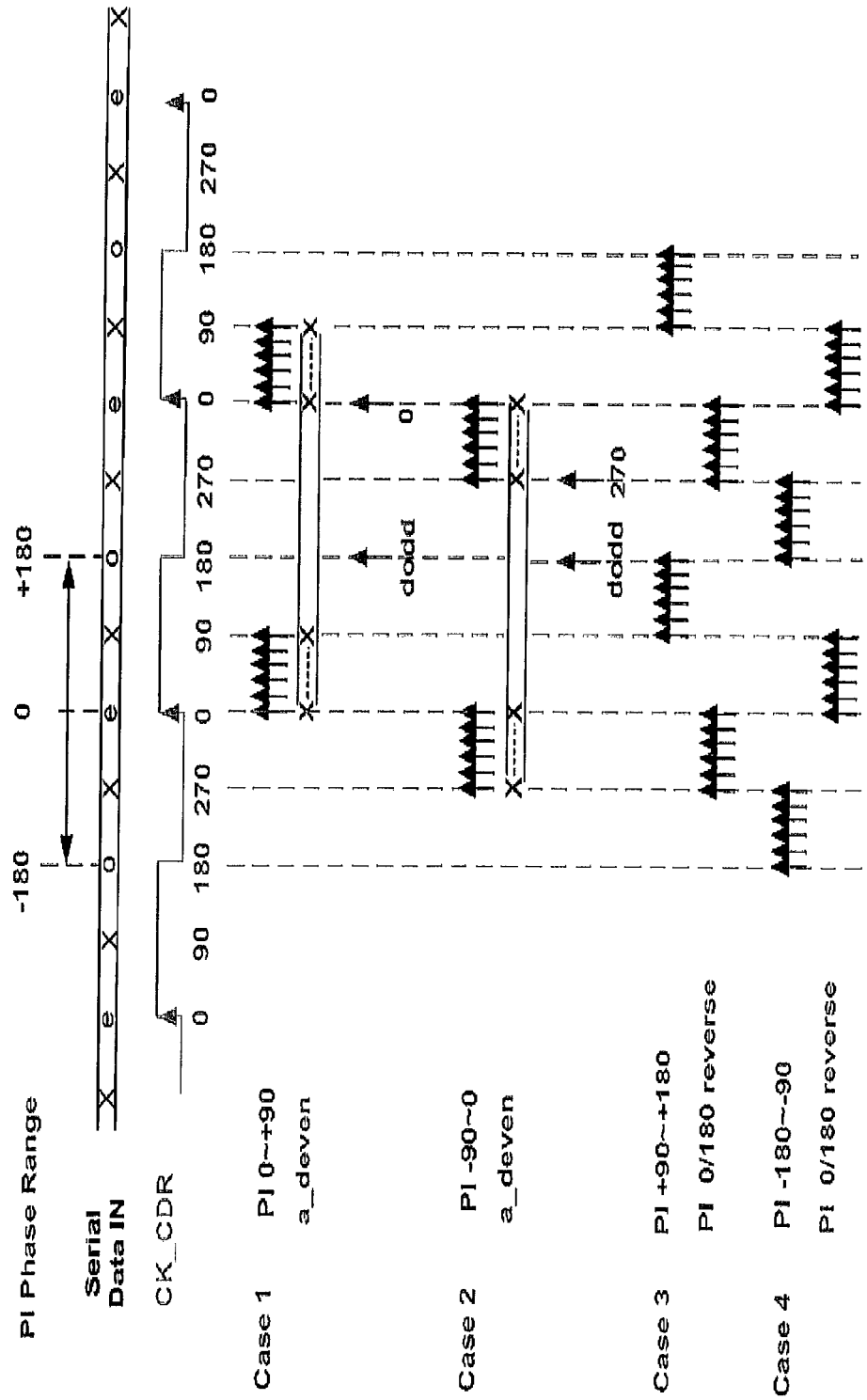
FIG. 5 is a timing diagram for data resynchronization in accordance with an embodiment of the invention.

FIG. 5 is a timing diagram for data resynchronization in accordance with an embodiment of the invention. The Serial Data In indicates the timing of the even (e) and odd (o) data bits. The CK_CDR shows the timing of the CDR clock signal. The Cases depicted in FIG. 5 are for even data.

In Case 1, the PI clock signals (with upward edges indicated by the upward arrows) have phase shifts relative to CK_CDR which are in the range from 0 to +90 degrees. The PI sampled data is selected by using the dodd signal at 180 degrees (of CK_CDR). A second sampling is performed at the subsequent DFF stage (410e or 460e) at 0 degrees (of CK_CDR).

In Case 2, the PI clock signals have phase shifts relative to CK_CDR which are in the range from −90 to 0 degrees. The PI sampled data is still selected by using the dodd signal at 180 degrees (of CK_CDR). However, the second sampling is performed at the subsequent DFF stage (410e or 460e) at 270 degrees (of CK_CDR). The phase used for the second sampling (either 0 or 270 degrees for even data, and either 180 degrees or 90 degrees for odd data) is selected using the Sel_2$^{nd}$ control signal (bit) that is output by the ODI Logic 132.

In Case 3, the PI clock signals have phase shifts relative to CK_CDR which are in the range from +90 to +180 degrees. In this case, a "reversal" operation is applied which swaps the PI 0 clock (CK_PI shifted by 0 degrees, shown in the first row of Case 3) with the PI 180 clock (CK_PI shifted by 180 degrees), and vice versa. The PI 0 clock after the swap is shown in the second row of Case 3. As seen, by swapping PI 0 and PI 180 clocks, Case 3 becomes equivalent to Case 2. Hence, after the swap, the PI 0 clock may be used to sample even data, while the dodd signal may be used to select the PI sampled data (i.e. as the output data MUX selector). The second sampling may be performed at the subsequent DFF stage (410e or 460e) at 270 degrees (of CK_CDR).

In Case 4, the PI clock signals have phase shifts relative to CK_CDR which are in the range from −180 to −90 degrees. In this case, the "reversal" operation is applied which swaps the PI 0 clock (CK_PI shifted by 0 degrees, shown in the first row of Case 4) with the PI 180 clock (CK_PI shifted by 180 degrees), and vice versa. The PI 0 clock after the swap is shown in the second row of Case 4. As seen, by swapping PI 0 and PI 180 clocks, Case 4 becomes equivalent to Case 1. Hence, after the swap, the PI 0 clock may be used to sample even data, while the dodd signal may be used to select the PI sampled data (i.e. as the output data MUX selector). The second sampling may be performed at the subsequent DFF stage (410e or 460e) at 0 degrees (of CK_CDR).

In an exemplary implementation, the ODI logic 132 may cause the BER Checker 136 to sequentially process the four cases described above. Selection may then be made of the minimum BER case. By selecting the minimum BER case, the case with the correct timing setting is chosen for data BER monitoring.

Note that, in the exemplary implementation described above, there are two DFE adaptation data paths. One data path uses Vref+ as the reference voltage, and the other data path uses Vref– as the reference voltage. In DFE mode, the data path to be used as the output path is dynamically selected by using CDR data (i.e. by using De and Do). In ODI mode, the output path is again selected between the data path using Vref+ and the data path using Vref–. The selection is made by the ODI logic 132 outputting the control bit vref_sel. The data path using Vref+ is selected to monitor the top half of the eye (shown in FIG. 6), and the data path using Vref– is selected to monitor the bottom half of the eye (also shown in FIG. 6).

The reference voltage levels are controllable. In DFE mode, the Vref+ and Vref– levels are controlled by the DFA Adaptation Engine 128 by using the DFE_bus signal. In ODI mode, the vertical sweep for the eye diagram (see FIG. 6) is performed by sweeping Vref+ and Vref– under control of the ODI logic 132 by using the ODI_bus signal.

Figure 6:
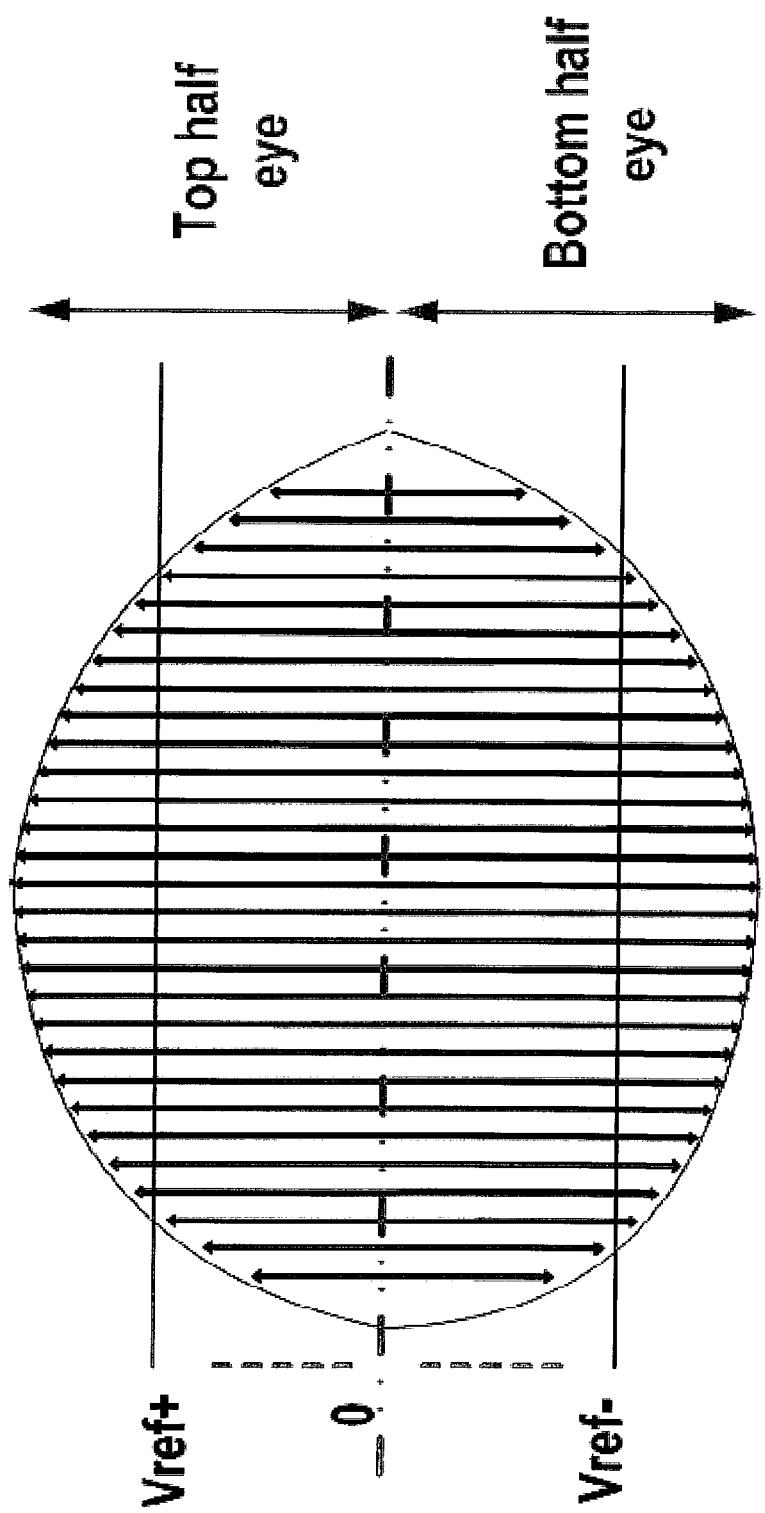
FIG. 6 is an eye diagram depicting sample clock steps in accordance with an embodiment of the invention.

FIG. 6 is an eye diagram depicting sample clock steps in accordance with an embodiment of the invention. In the example implementation depicted, 32 sample clock steps are shown in one unit interval (UI). Other numbers of sample clock steps per UI may be utilized in other implementations. The CK_PI clock signal output from the phase interpolator (PI) 134 may be stepped accordingly.

Figure 7:
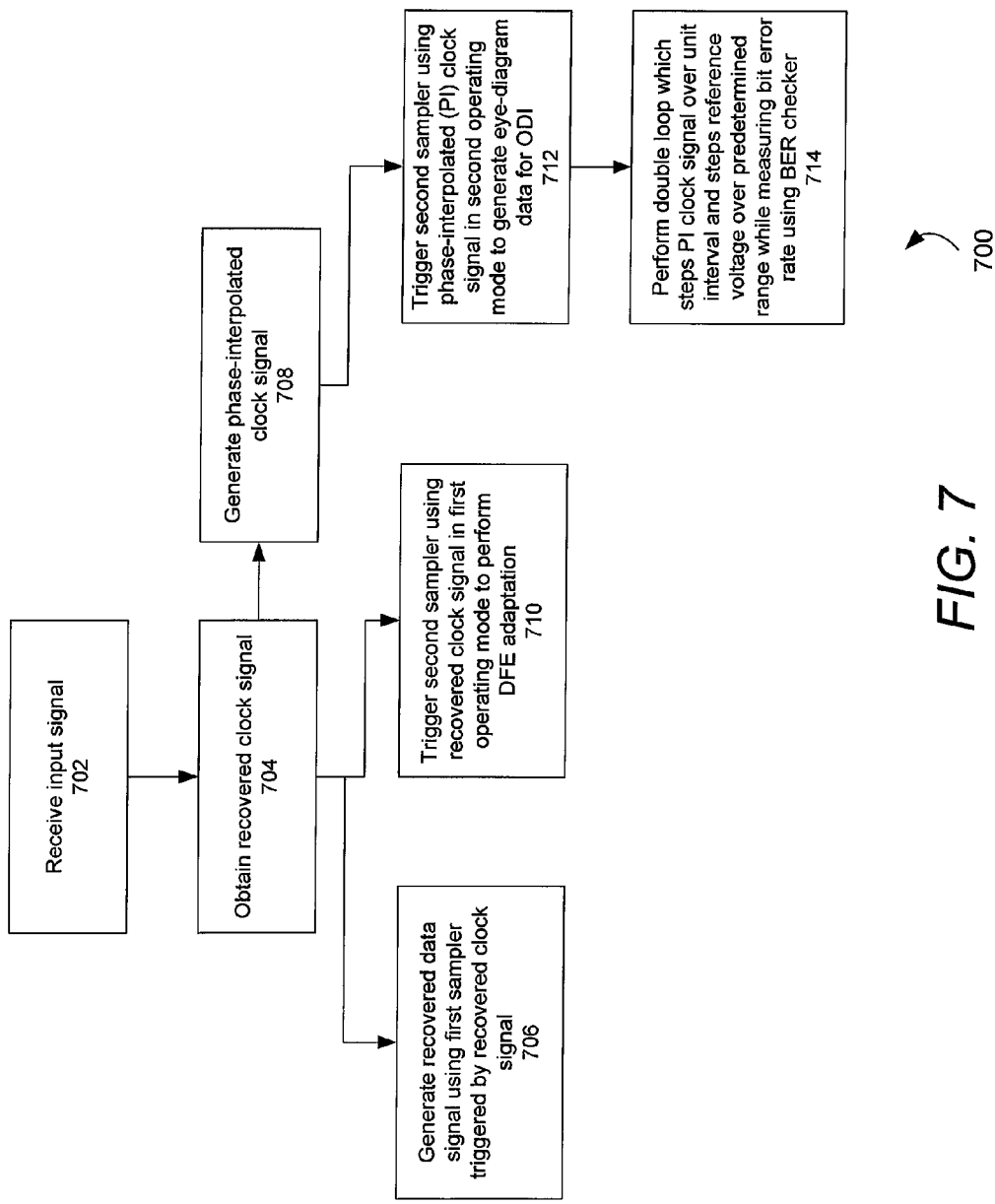
FIG. 7 is a flow chart of a method 700 of providing both on-die instrumentation and decision feedback equalization in an integrated circuit in accordance with an embodiment of the invention.

FIG. 7 is a flow chart of a method 700 of providing both on-die instrumentation and decision feedback equalization in an integrated circuit in accordance with an embodiment of the invention. An input signal is received 702 from a data link. A recovered clock signal may be obtained 704 from the input signal. In addition, a recovered data signal may be generated 706 from the input signal using a first sampler triggered by the recovered clock signal.

In accordance with an embodiment of the invention, a phase-interpolated clock signal may be generated 708 by applying phase interpolation to the recovered clock signal. A second sampler may be triggered 710 using the recovered clock signal in a first operating mode which performs decision feedback equalization adaptation. In addition, the second sampler may be triggered 712 using the phase-interpolated clock signal in a second operating mode so as to generate eye-diagram data for the on-die instrumentation.

In the second operating mode, a double loop may be performed 714 where the phase-interpolated clock signal is stepped over a unit interval, and the magnitude of the positive and negative reference voltages for the second sampler are stepped over a predetermined range. Within the double loop, a bit error rate may be determined using the BER checker.

Figure 8:
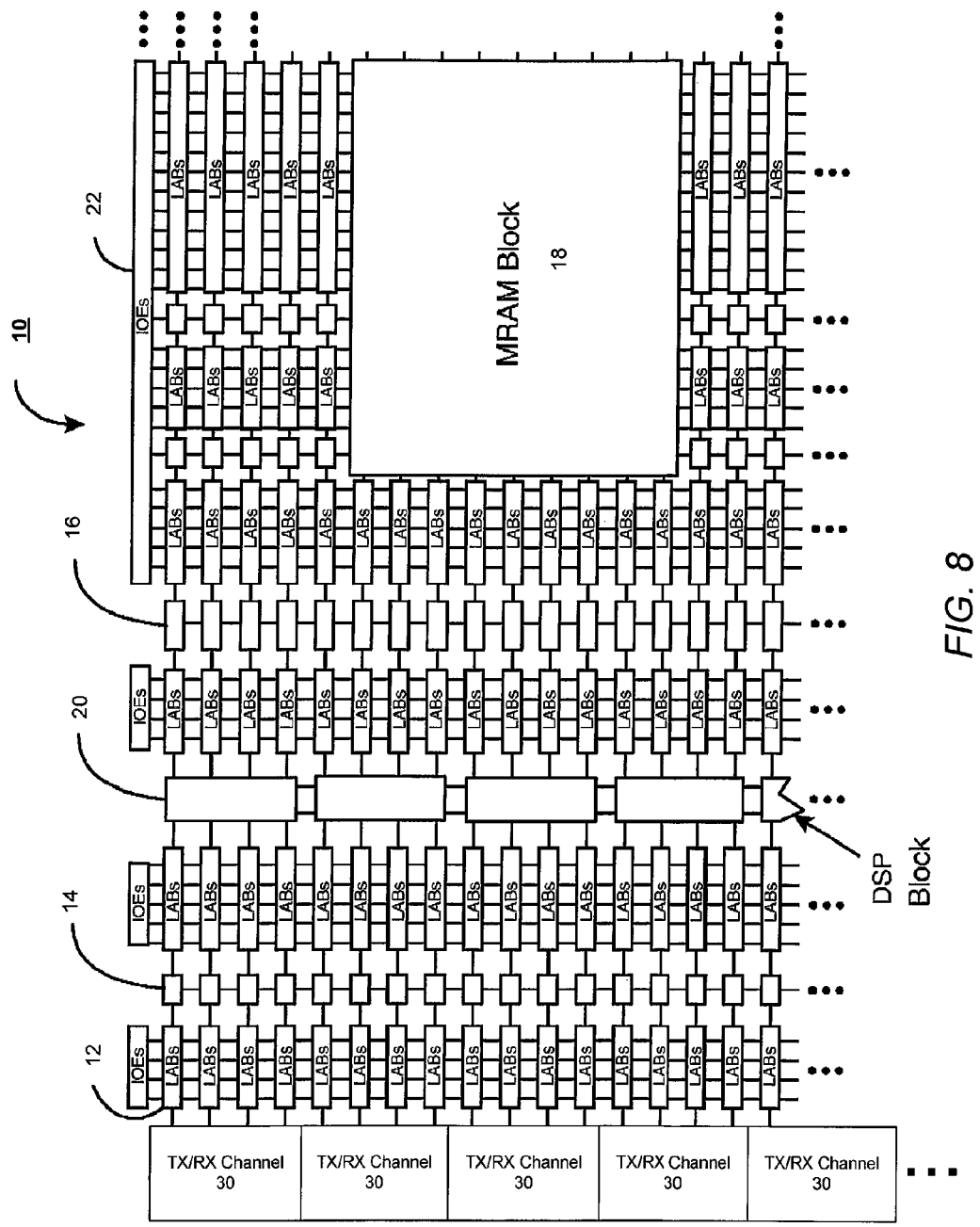
FIG. 8 is a simplified partial block diagram of a field programmable gate array (FPGA) that can include aspects of the present invention.

FIG. 8 is a simplified partial block diagram of a field programmable gate array (FPGA) 10 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the receiver circuitry described herein.

It is to be understood that FPGA 10 is described herein for illustrative purposes only and that the present invention can be implemented in many different types of PLDs, FPGAs, and ASICs.

Figure 9:
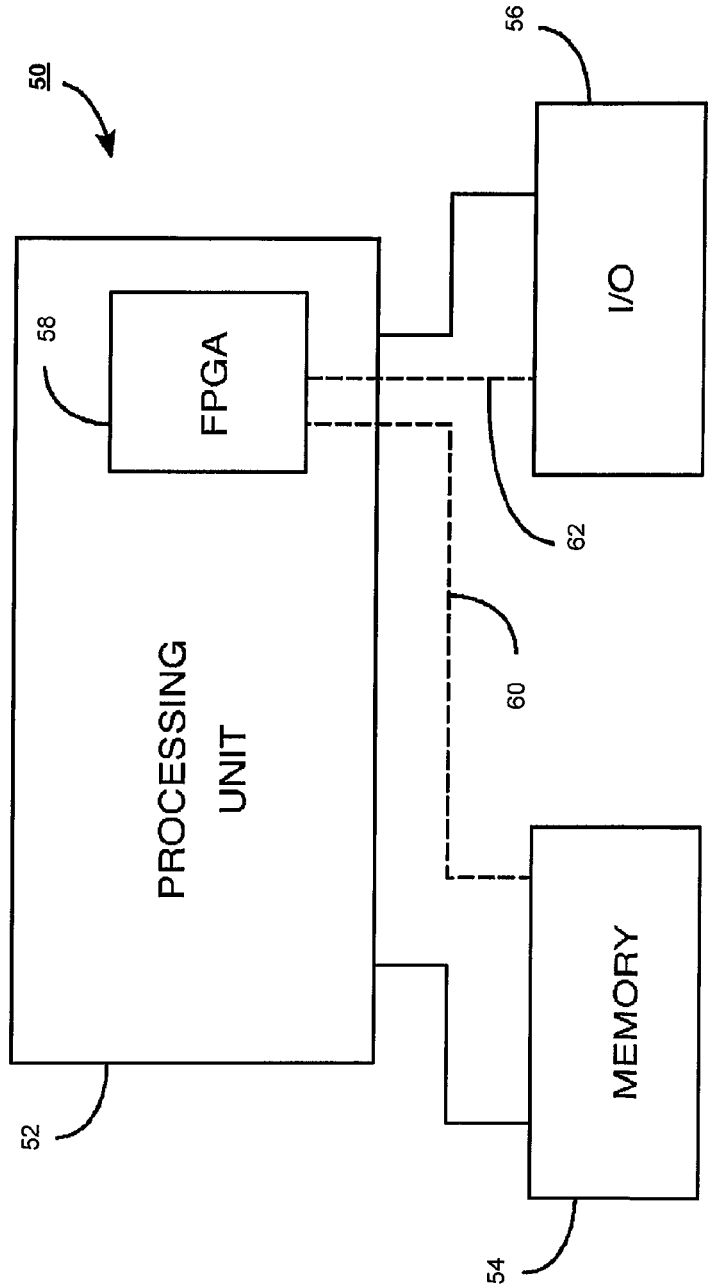
FIG. 9 is a block diagram of an exemplary digital system that can employ techniques of the present invention.

FIG. 9 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A receiver for a data link, the receiver comprising:
   a data path receiving an input signal from the data link, the data path comprising
   a clock data recovery (CDR) loop for obtaining a recovered clock signal from the input signal, and first sampler circuitry triggered by the recovered clock signal for generating a recovered data signal from the input signal;
a phase interpolator receiving the recovered clock signal and generating a phase-interpolated clock signal; and
decision feedback equalization (DFE) circuitry comprising second sampler circuitry triggered by the recovered clock signal in a first operating mode and by the phase-interpolated clock signal in a second operating mode.

2. The receiver of claim 1, wherein the first operating mode performs speculative DFE adaptation, and wherein the second operating mode performs on-die instrumentation functionalities.

3. The receiver of claim 1, wherein a phase of the phase-interpolated clock signal is stepped across a unit interval in the second operating mode.

4. The receiver of claim 3 further comprising:
a bit error rate checker that, in the second operating mode, receives the recovered clock signal, the recovered data signal, and a phase-interpolated data signal which is output by the second sampler circuitry.

5. The receiver of claim 1 further comprising:
a reference voltage generator that provides to the second sampler circuitry a first pair of reference voltages controlled by a DFE adaptation engine in the first operating mode and a second pair of reference voltages controlled by on-die instrumentation logic in the second operating mode.

6. The receiver of claim 5, wherein a voltage level of the second pair of reference voltages is stepped over a range of voltage levels in the second operating mode.

7. The receiver of claim 1, wherein the second sampler circuitry comprises a first even sampler and a first odd sampler that utilize a positive-polarity reference voltage and a second even sampler and a second odd sampler that utilize a negative-polarity reference voltage.

8. The receiver of claim 7, wherein the second sampler circuitry further comprises a series of flip flop circuits after each of the first even sampler, the first odd sampler, the second even sampler, and the second odd sampler.

9. The receiver of claim 8, wherein the series of flip flop circuits perform resynchronization between a clock domain of the phase-interpolated clock signal and a clock domain of the recovered clock signal.

10. A method of providing both on-die instrumentation and decision feedback equalization in an integrated circuit, the method comprising:
receiving an input signal from a data link;
obtaining a recovered clock signal from the input signal;
generating a recovered data signal from the input signal using a first sampler triggered by the recovered clock signal;
generating a phase-interpolated clock signal by applying phase interpolation to the recovered clock signal;
triggering a second sampler using the recovered clock signal in a first operating mode which performs decision feedback equalization adaptation; and
triggering the second sampler using the phase-interpolated clock signal in a second operating mode so as to generate eye-diagram data for the on-die instrumentation.

11. The method of claim 10 further comprising:
stepping a phase of the phase-interpolated clock signal across a unit interval in the second operating mode.

12. The method of claim 10 further comprising:
determining a bit error rate using the recovered clock signal, the recovered data signal, and a phase-interpolated data signal output from the second sampler in the second operating mode.

13. The method of claim 10 further comprising:
providing to the second sampler a first pair of reference voltages controlled by a DFE adaptation engine in the first operating mode and a second pair of reference voltages controlled by on-die instrumentation logic in the second operating mode.

14. The method of claim 13
stepping a voltage level of the second pair of reference voltages over a range of voltage levels in the second operating mode.

15. The method of claim 10 further comprising:
performing resynchronization between a clock domain of the phase-interpolated clock signal and a clock domain of the recovered clock signal.

16. The method of claim 15, wherein the second sampler comprises a first even sampler and a first odd sampler that utilize a positive-polarity reference voltage and a second even sampler and a second odd sampler that utilize a negative-polarity reference voltage, and wherein the resynchronization is performed by a series of flip flop circuits after each of the first even sampler, the first odd sampler, the second even sampler, and the second odd sampler.

17. A receiver for a high-speed serial interface, the receiver comprising:
a clock data recovery loop for obtaining a recovered clock signal from a received input signal
a first sampler triggered by the recovered clock signal for generating a recovered data signal from the received input signal;
a phase interpolator generating a phase-interpolated clock signal from the recovered clock signal; and
a second sampler triggered by the recovered clock signal in a decision feedback equalization mode and by the phase-interpolated clock signal in an on-die instrumentation mode.

18. The receiver of claim 17, wherein a phase of the phase-interpolated clock signal is stepped across a unit interval in the on-die instrumentation mode.

19. The receiver of claim 17 further comprising:
a bit error rate checker that, in the second operating mode, receives the recovered clock signal, the recovered data signal, and a phase-interpolated data signal which is output by the second sampler circuitry.

20. The receiver of claim 17 further comprising:
a reference voltage generator that provides to the second sampler circuitry a first pair of reference voltages controlled by a decision feedback equalization adaptation engine in the first operating mode and a second pair of reference voltages controlled by on-die instrumentation logic in the second operating mode.

* * * * *